May 24, 1960 C. W. HALFORD, JR 2,937,564
APPARATUS FOR PRODUCING ANIMATED EFFECTS
Filed Feb. 24, 1958 4 Sheets-Sheet 1

INVENTOR
Charles W. Halford, Jr.

BY Mason, Fenwick & Lawrence
ATTORNEYS

May 24, 1960 C. W. HALFORD, JR 2,937,564
APPARATUS FOR PRODUCING ANIMATED EFFECTS
Filed Feb. 24, 1958 4 Sheets-Sheet 2
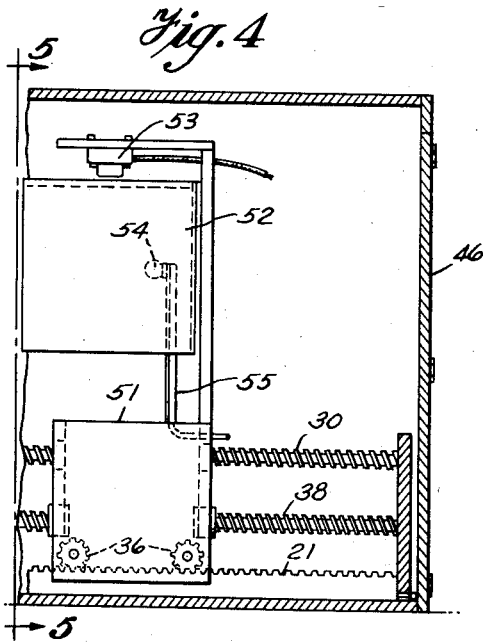
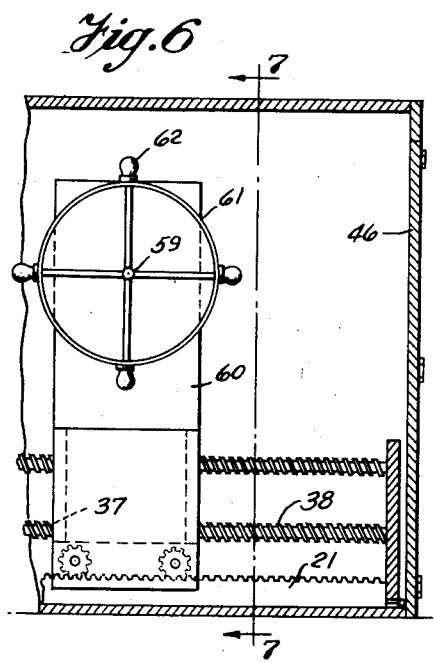
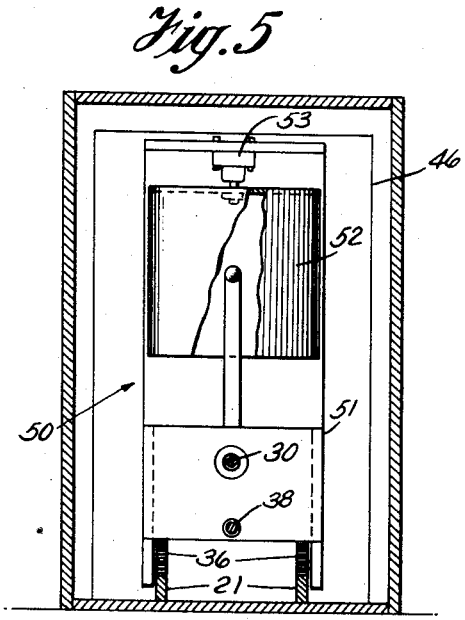
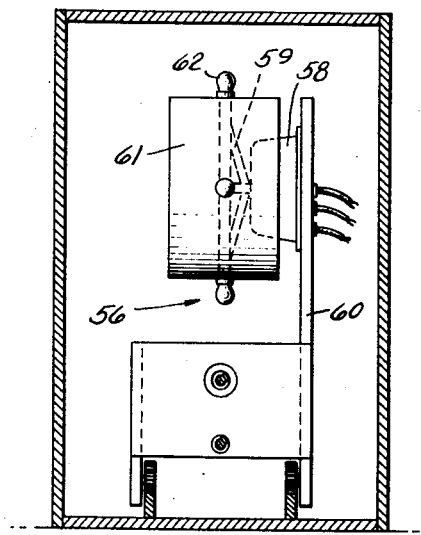
INVENTOR
Charles W. Halford, Jr.
BY
Mason, Fenwick & Lawrence
ATTORNEYS May 24, 1960   C. W. HALFORD, JR   2,937,564
APPARATUS FOR PRODUCING ANIMATED EFFECTS
Filed Feb. 24, 1958   4 Sheets-Sheet 3

INVENTOR
Charles W. Halford, Jr.

BY Mason, Fenwick & Lawrence
ATTORNEYS

May 24, 1960 C. W. HALFORD, JR 2,937,564
APPARATUS FOR PRODUCING ANIMATED EFFECTS
Filed Feb. 24, 1958 4 Sheets-Sheet 4

INVENTOR
Charles W. Halford, Jr.

BY Mason, Fenwick & Lawrence
ATTORNEYS

United States Patent Office 2,937,564
Patented May 24, 1960

2,937,564

APPARATUS FOR PRODUCING ANIMATED EFFECTS

Charles W. Halford, Jr., Salt Lake City, Utah;
1410 S. 4th E., Bountiful, Utah

Filed Feb. 24, 1958, Ser. No. 717,184

9 Claims. (Cl. 88—16)

The present invention relates in general to display apparatus, and more particularly to apparatus for producing animation and display effects for recording on motion picture film.

An object of the present invention is the provision of novel apparatus which facilitates the production of a variety of animated display effects to be recorded on motion picture film and used for theatre presentation or televised reproduction or the like.

Another object of the present invention is the provision of apparatus for producing animated display effects wherein the elements are associated in a novel manner to facilitate production of a wide variety of animated and montage effects to be recorded photographically on motion picture film.

Another object of the present invention is the provision of novel apparatus for producing animated images of inanimate objects in a variety of display patterns, wherein different pattern producing illuminating sources may be readily incorporated in the unit to produce the desired effects.

Other objects, advantages and capabilities of the present invention will become apparent from the following detailed description taken in conjunction with the accompanying drawings illustrating preferred forms of the invention.

In the drawings:

Figure 4 is a fragmentary vertical longitudinal section view through the rear portion of the housing showing a different form of illumination unit mounted in the apparatus;

Figure 5 is a vertical transverse section view taken along the line 5—5 of Figure 4;

Figure 6 is a fragmentary vertical longitudinal section view taken through the rear portion of the housing with another alternative form of illumination unit positioned in the housing;

Figure 7 is a vertical transverse section view taken along the line 7—7 of Figure 6;

The apparatus of the present invention is designed to provide a convenient facility for producing a wide variety of animated or moving pattern effects on a screen in the nature of a frosted glass screen. The resultant image may be photographically recorded on moving picture film with a camera mounted on a tripod positioned in front of the screen. The apparatus basically consists of an illuminating source for the screen which is selected at will from several illumination units designed to produce different lighting effects, and a rack assembly for supporting one or a plurality of transparent sheets or negatives between the illuminating source and the screen to be imaged on the screen. The moving pattern effect is derived from the motion of the lamp or plurality of lamps in the illuminating unit, or by relative motion between the lamp and a transparent carrier or carriers for the pictures to be imaged. The motion picture film on which the patterns or images are recorded may be displayed on television in the usual manner or the image on the screen may be directly sensed by the television camera for direct transmission. The apparatus is arranged to facilitate ready interchangeability of illuminating units and transparent picture carriers, and adjustment of the position of the illuminating units and rack assembly to vary the display pattern produced on the screen.

Figure 1:
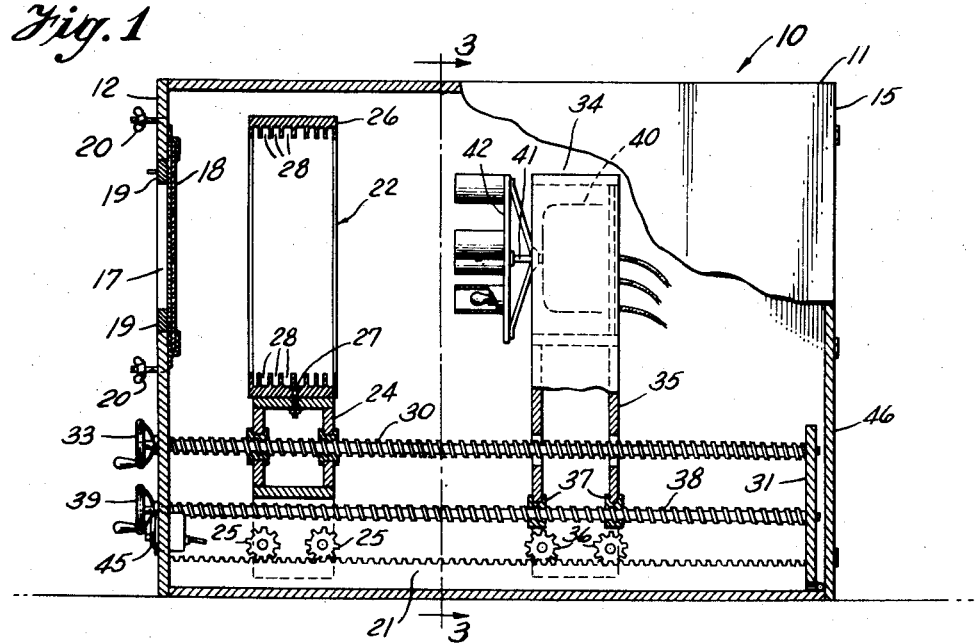
Figure 1 is a side elevation view of animated effects producing apparatus embodying the present invention, with parts shown in section.
Figure 2:
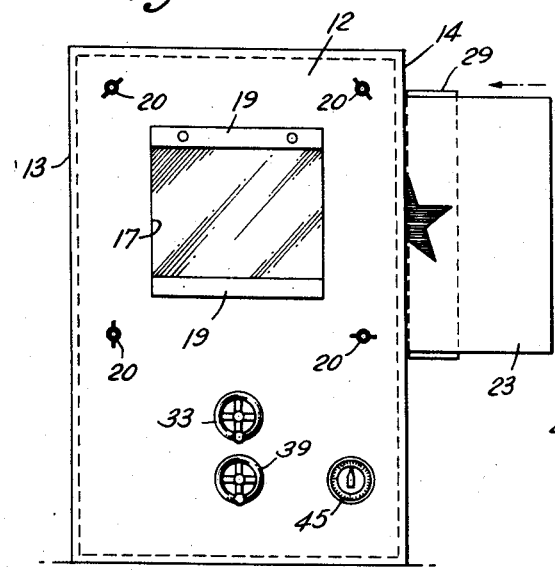
Figure 2 is a front elevation of the apparatus showing one of the image-forming transparencies partially withdrawn from the apparatus housing.
Figure 3:
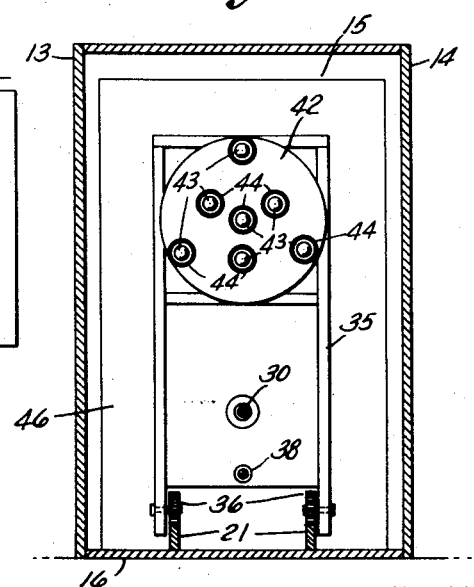
Figure 3 is a vertical transverse section view taken along the line 3—3 of Figure 1.

Referring to the drawings wherein like reference characters designate corresponding parts throughout the several figures, and particularly to the unit disclosed in Figures 1–3, inclusive, the animated effects producing apparatus of the present invention, generally indicated by the reference character 10, is incorporated in a substantially rectangular housing 11 including a front wall 12, side walls 13 and 14, rear wall 15 and bottom 16. The front wall 12 is provided with a rectangular opening 17 immediately behind which is supported a display screen 18 which, in one preferred embodiment, is formed of a pair of clear glass plates between which is mounted a sheet of tracing paper or the like to produce a frosted glass effect. The visual effects to be photographically recorded are imaged on the screen 18 and the photographic camera or television camera senses the images through the opening 17 in the front wall 12. Masking blocks 19 are provided at the upper and lower edges of the opening 17. The uppermost masking block 19 is preferably provided with outwardly projecting pegs or the like on which transparent carriers bearing a worded inscription or title, an advertising sponsor's name, or the like, so that the inscription will be photographically superimposed over the background imaged on the screen 18. A plurality of wing nut units 20 are also provided on the front wall 12 in spaced relation to the opening 17 for supporting attachments to be later described.

Extending longitudinally within the housing 11 and supported on the bottom 16 are a pair of parallel racks 21 having gear teeth thereon. A transparency supporting assembly 22 is disposed within the housing 11 for longitudinal movement along the racks 21 to support one or several transparencies 23 in a position so that the designs formed thereon are imaged on the screen 18. The transparency supporting assembly 22 comprising a carriage 24 having pinions 25 journalled thereon to ride on the racks 21. A rectangular open frame 26 is pivotally supported on the carriage 24 by the pivot bolt 27 for rotation about the medial vertical axis of the frame 26. The frame is provided with a plurality of parallel guide slots 28 for slidably supporting the transparencies 23 within the frame 26. The side wall 14 of the housing 11 is provided with a hinged door 29 which is laterally aligned with the frame 26 to facilitate insertion and withdrawal of the transparencies 23. An elongated worm 30 is journalled at its rearmost end in a baffle plate 31 hinged to the bottom 16 adjacent the rear wall 15 and is threadedly coupled to suitable bearings 32 in the carriage 24 to drive the transparency supporting assembly 22 longitudinally of the housing 11 in accordance with rotation of the worm 30. The forward end of the worm 30 extends through the front wall 12 of the housing 11 and terminates in a crank 33 by which the worm 30 may be manually rotated to adjust the position of the transparency supporting assembly 22.

There is illustrated in Figures 1–3, inclusive, one form of illuminating unit 34 which may be used to produce animated display effects. The illuminating unit 34 comprises a vertically extending carriage 35 having pinions 36 journalled on stub shafts at the lower end thereof to ride on the racks 21 and bearings 37 threadedly coupled with a worm 38 disposed below and extending parallel with the worm 30. The worm 38 is likewise journalled at its rear end in the baffle plate 31 and projects through the carriage 24 of the transparency supporting assembly 22 without engagement therewith and through the front wall 12 of the housing 11. The forward end of the worm 38 also terminates in a crank 39 by which the worm is manually adjusted. The carriage is also provided with openings through which the worm 30 may project without engagement with the carriage 35 so that adjustment of the worm 30 does not impart motion to the illuminating unit 34. An electric motor 40 is supported on the carriage 35 in approximate alignment with the center of the screen 18. The shaft 41 of the motor 40 extends horizontally along an axis substantially intersecting the center of the screen 18. A disk 42 is supported at its center on the shaft 41 of the motor 40 and carries a plurality of lamps 43 on the surface of the disk 42 facing the screen 18. The lamps 43 are preferably arranged in the pattern illustrated in Figure 3 wherein one lamp is positioned at the center of the disk and the remaining lamps are located along a triangular path which is concentric with the disk. Each of the lamps 43 is shielded by an open-ended tubular shield 44 which opens toward the screen 18 and is arranged in parallelism with the axis of the disk. A rheostat 45 mounted on the front wall 12 is coupled with the electric motor 40 to control the speed of the motor.

If a transparency 23 having a single star or like design, as illustrated in Figure 2, is positioned in the transparency supporting assembly 22, the seven lamps 43 of the illuminating unit 34 will produce seven images of the star on the screen 18 and upon rotation of the disk 42, the images produced by all of the lamps 43 except the one located at the center of the disk will rotate on the screen 18 about the star image produced by the lamp located at the center of the disk 42, creating a unique composite effect. The composite design may be focused by adjustment of the spacing of the transparency supporting assembly 22 and illuminating unit 34 from the screen 18 so that some of the images of the star cast by the lamps 43 overlap one another, and the star designs may be made partially transparent to produce unusual animated effects with an illusion of depth or third dimension in the image.

The rear wall 15 of the housing 11 is provided with a large hinged door 46 of sufficient size to accommodate passage of the illuminating unit 34 therethrough to facilitate substitution of other illuminating units for the one just described.

A second form of illuminating unit, indicated by the reference character 50, is illustrated in Figures 4 and 5. The illuminating unit 50 is designed to produce a laterally moving background effect in the image produced on the screen 18. The illuminating unit 50 comprises a carriage 51 having pinions 36 and 37 designed to cooperate with the racks 21 and worm 38 in the same manner as the corresponding components of the unit 34. Supported for rotation about a vertical axis at an elevated position above the carriage 51 is a drum 52 whose periphery is formed of transparent sheet material on which selected designs may be placed. The drum driven by an electric motor 53 supported on the carriage 51 surrounds a single lamp 54 carried on the post 55 projecting vertically from the carriage. The lamp 54 is positioned in horizontal alignment with the center of the screen 18.

It will be seen that upon rotation of the drum 52 with the designs supported on the transparent periphery of the drum, the images of the design appearing as background images on the screen 18 will traverse the screen laterally in accordance with the speed of rotation of the drum 52.

Figures 6 and 7 disclose another form of illuminating unit, indicated by the reference character 56, to produce vertically moving design effects in the image formed on the screen 18. The illuminating unit 56 includes a carriage 57 having pinions 36 adjustably supporting the carriage 57 on the racks 21 and threaded bearings 37 coupled with the worm 38. A motor 58 having a horizontally disposed shaft 59 is supported on the upstanding member 60 carried by the carriage 57. A cylindrical drum 61 of opaque material is fixed to the shaft 59 of the motor 58 arranged for rotation on a horizontal axis extending transversely of the housing 11 and perpendicular to the longitudinal axis of the housing 11 intercepting the center of the screen 18. A plurality of lamps 62 carried on the periphery of the drum 61 extend radially outwardly of the drum periphery, the lamps 62 being preferably disposed in a vertical plane bisecting the screen 18. Assuming the drum 61 is rotated in a clockwise direction as viewed in Figure 6, and a design such as a star or a plurality of stars is provided on the transparent sheet 23 supported in the transparency supporting assembly 22, the effect will be to wipe the projected image of the transparency design vertically downwardly along the screen 18. If desired, suitable commutator or contact means may be associated with the lamps 62 to periodically energize and de-energize the lamps so as to further vary the light pattern produced on the screen 18.

Figure 8:
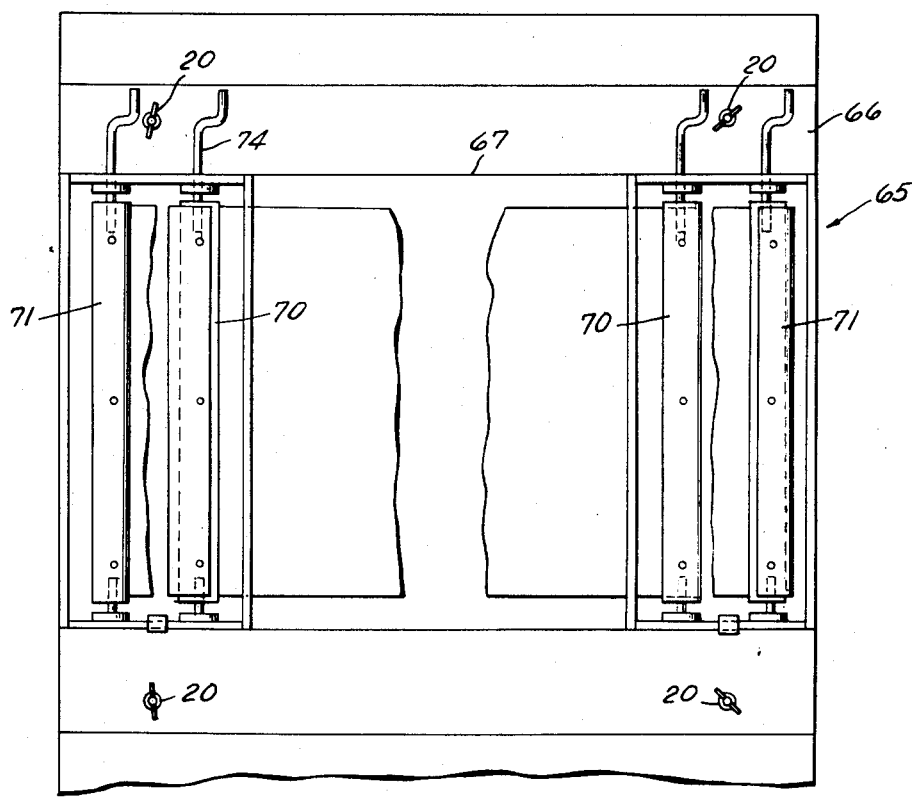
Figure 8 is a front elevation of a manual moving portrayal attachment which may be removably mounted on the front wall of the housing.
Figure 9:
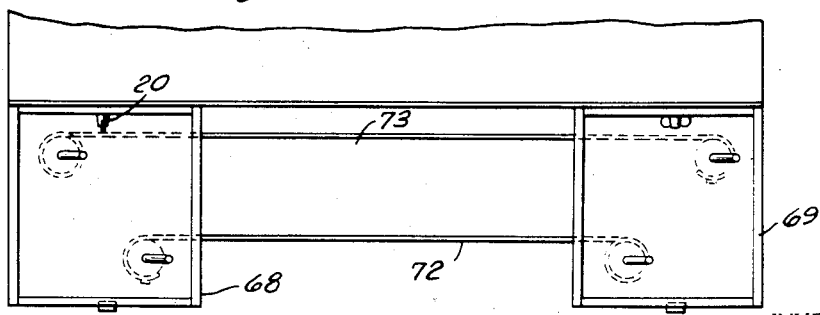
Figure 9 is a top plan view of the attachment illustrated in Figure 8.

An attachment, generally indicated by the reference character 65 to be removably supported on the front wall 12 of the housing 11 in overlying relation to the screen 18, is illustrated in Figures 8 and 9. This attachment is designed to provide laterally moving foreground effects in the composite image produced by the apparatus, and comprises a mounting plate 66 which is suitably apertured to be affixed to the front wall 12 by the wing nut units 20. The mounting plate 66 has a rectangular aperture 67 corresponding substantially to the front wall opening 17 of the housing 11 and registering with the opening 17. Boxes 68 and 69 are carried by the mounting plate 66 in laterally flanking relation to the opening 67, each of the boxes 68 and 69 having rolls 70 and 71 journalled therein for supporting transparent sheets 72 and 73 on which various designs may be imprinted. Each of the rolls 70 and 71 is provided with a hand crank 74 which projects above the tops of the boxes 68, 69 to an accessible position whereby the rolls may be readily manipulated by the operator in corresponding directions or in opposite directions to provide laterally moving designs in the image field.

Figures 10, 11:
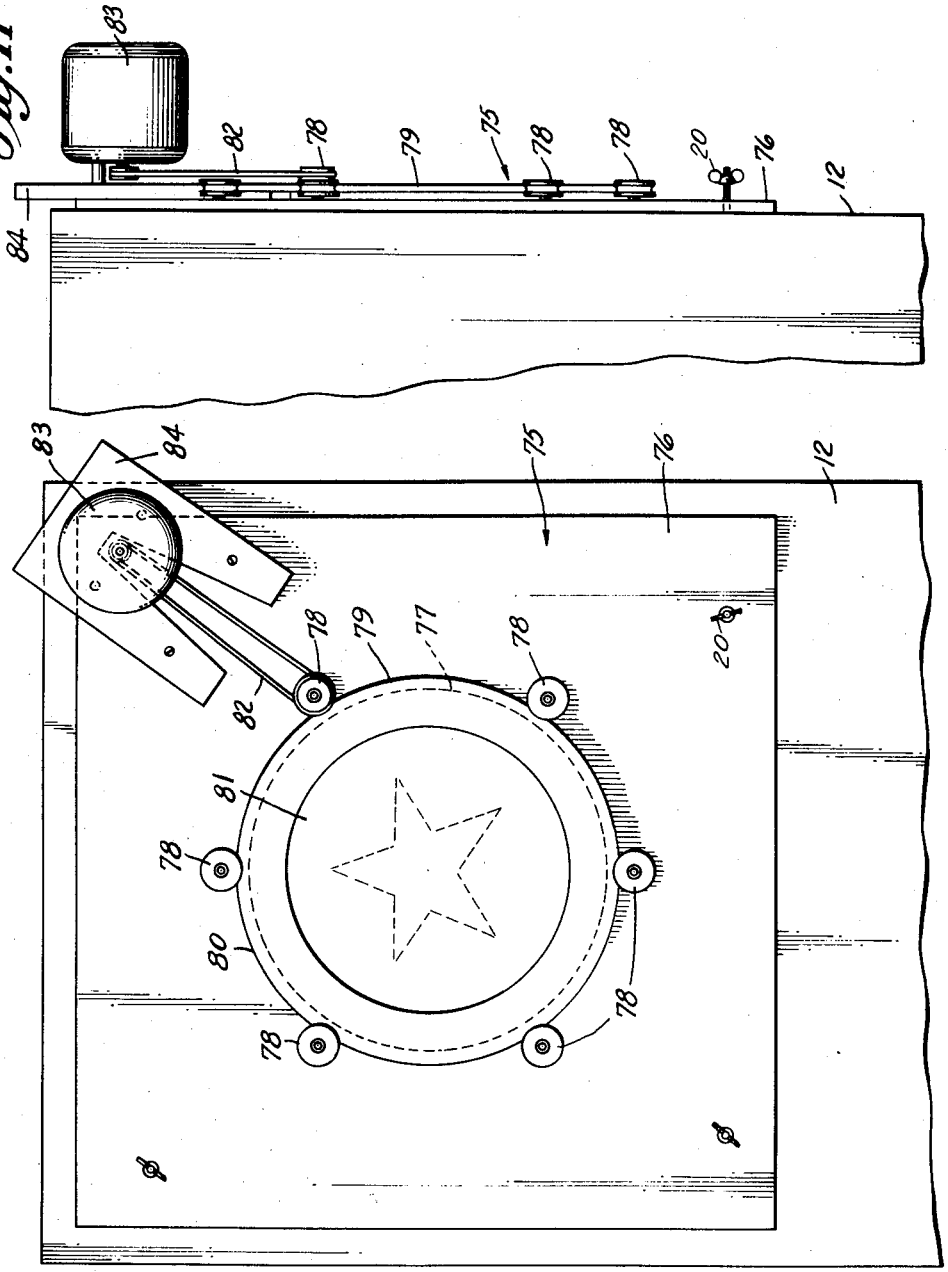
Figure 10 is a front elevation of a rotary display attachment which may be removably mounted on the front wall of the housing.
Figure 11 is a side elevation of the attachment illustrated in Figure 10.

Another attachment, indicated generally by the reference character 75 designed to provide rotary foreground effects, is illustrated in Figures 10 and 11. The attachment 75 comprises a rectangular mounting plate 76 which is suitably apertured to be secured to the front wall 12 in overlying relation to the screen opening 17 and has a circular aperture 77 which is centered over the front wall opening 17. A plurality of idler spools 78 are provided on the mounting plate 76 in concentric relation to the circular aperture 77 and spaced slightly outwardly of the periphery thereof for supporting a disk 79. The disk 79 is preferably formed with an annular fiber rim 80 which rides in the grooved peripheries of the spools 78 and a transparent sheet 81 in the center thereof having suitable designs thereon. One of the spools 78 is driven by a belt 82 extending around the spool and around the shaft of an electric motor 83 supported on the mounting plate 76 by a bracket 84. It will be apparent that a design formed on the sheet 81 of the disk 79 which is centered on the disk will appear to rotate about its own center upon rotation of the disk 79. Alternatively, an annular object such as an automobile tire or a ball, or some similar design, may be centered on the disk 79, and a composite picture simulating rotation of the tire or ball along a highway or the like may be formed by using the illuminating source 50 in the housing with the highway or other scenic design formed on the drum periphery 52 of the illuminating unit 50.

From the above description, it will be apparent that apparatus has been provided which may be conveniently arranged to produce highly unique and spectacular animated effects in a composite or montage image on the diffusing screen, wherein portions of the image may be made to rotate about the center of the screen, or background image portions may be made to move laterally across the screen, or the entire image may be made to move vertically along the screen and increase in intensity as it approaches the center of the screen and diminish in intensity as it leaves the center of the screen, or foreground portions of the image may be made to move laterally of the screen or rotate about the center of the screen. Thus, a wide variety of animated effects may be produced with great facility to produce composite animated images to be photographically recorded, which recorded images will be ideally suited for short-duration television commercials and the like wherein spectacular animated effects are desirable to attract the attention of the viewer. Also, the wide variety of movements which may be achieved by this apparatus renders it highly adaptable to the production of certain montage effects in producing certain motion pictures of moving objects in relation to selected scenic backgrounds.

While the above description discloses practical embodiments of the invention, it will be understood by those skilled in the art that the disclosure represents exemplary embodiments and that other re-arrangements of parts cooperable to carry out the inventive concept are to be regarded as within the purview of the invention.

I claim:

1. Apparatus for producing animated image effects to be photographically recorded for production of motion pictures, filmed television program items and the like comprising a housing including a vertical front wall having a display opening therein, diffusing screen means covering said display opening and adapted to have a composite animated image formed thereon to be photographed, guide means in said housing extending along an axis normal to said diffusing screen means, an illuminating unit supported for movement along said guide means, transparency supporting means supported for movement along said guide means and disposed between said illuminating unit and said diffusing screen means, said transparency supporting means having formations for supporting a plurality of transparent sheets carrying designs in parallelism to each other intercepting the radiation path from said illuminating unit to said diffusing screen means, access means in said housing adjacent said transparency supporting means for accommodating passage of said transparent sheets therethrough, said illuminating unit including projector lamp means for imaging the designs carried by said transparent sheets onto said diffusing screen means and an electric motor for producing movement of the projector lamp means angularly of said axis to produce movement of the designs imaged on said diffusing screen means, and drive means coupled independently to said illuminating unit and said transparency supporting means and having manually operable parts located externally of said housing for adjusting the position of said illuminating unit and said transparency supporting means along said guide means.

2. Apparatus for producing animated image effects to be photographically recorded for production of motion pictures, filmed television program items and the like comprising an elongated housing including a transverse vertical front wall having a display opening therein and side walls, a planar, translucent diffusing screen covering said display opening and adapted to have a composite animated image formed thereon to be photographed from externally of the housing, parallel guide rack members in said housing extending longitudinally of the housing along an axis normal to the plane of said diffusing screen, an illuminating unit supported for movement along said guide rack members, a transparency supporting unit including a carriage movable along said guide rack members and a transparency supporting frame pivotally supported on said carriage for rotation about the vertical medial axis of the frame and disposed between said illuminating unit and said diffusing screen, said transparency supporting frame having transverse slots opening laterally of the frame for supporting a plurality of design-carrying transparent sheets in parallelism to each other intercepting the radiation path from said illuminating unit to said diffusing screen, one of said side walls having an access opening therein laterally aligned with said transparency supporting frame for accommodating passage of said transparent sheets therethrough, said illuminating unit including projecting lamp means for imaging the designs carried by said transparent sheets onto said diffusing screen and an electric motor for producing movement of the projector lamp means angularly of said axis to produce movement of the designs imaged on said diffusing screen means, and means manually adjustable externally of said housing for adjusting the position of said illuminating unit and said transparency supporting unit along said guide rack members.

3. Apparatus for producing animated image effects to be photographically recorded for production of motion pictures, filmed television program items and the like comprising a housing including a vertical front wall having a display opening therein, diffusing screen means covering said display opening and adapted to have a composite animated image formed thereon to be photographed, guide means in said housing extending along an axis normal to said diffusing screen means, an illuminating unit supported for movement along said guide means, transparency supporting means supported for movement along said guide means and disposed between said illuminating unit and said diffusing screen means, said transparency supporting means having formations for supporting a plurality of transparent sheets carrying designs in parallelism to each other intercepting the radiation path from said illuminating unit to said diffusing screen means, access means in said housing adjacent said transparency supporting means for accommodating passage of said transparent sheets therethrough, said illuminating unit including a carriage having wheel means thereon riding on said guide means, an electric motor supported on said carriage having an output shaft aligned with a horizontal axis intercepting the center of said diffusing screen means, a circular disk affixed to said output shaft in concentric relation thereto and arranged in a vertical plane paralleling the plane of said screen means, and a plurality of projector lamps mounted on the face of said disk adjacent said screen means and projecting toward said screen means, and an open-ended tubular shield surrounding each of said projector lamps and opening in the direction of said screen means, and drive means manually operable externally of said housing for adjusting the position of said illuminating unit and said transparency supporting means along said guide means.

4. Apparatus for producing animated image effects to be photographically recorded for production of motion pictures, filmed television program items and the like comprising an elongated housing including a transverse vertical front wall having a display opening therein and side walls, a planar, translucent diffusing screen covering said display opening and adapted to have a composite animated image formed thereon to be photographed from externally of the housing, parallel guide racks in said housing extending longitudinally of the housing along an axis normal to the plane of said diffusing screen, an illuminating unit supported for movement along said guide racks, a transparency supporting unit including a carriage movable along said guide racks and a transparency supporting frame pivotally supported on said carriage for rotation about the vertical medial axis of the frame and disposed between said illuminating unit and said diffusing screen, said transparency supporting frame having transverse slots opening laterally of the frame for supporting a plurality of design-carrying transparent sheets in parallelism to each other intercepting the radiation path from said illuminating unit to said diffusing screen, one of said side walls having an access opening therein laterally aligned with said transparency supporting frame for accommodating passage of said transparent sheets therethrough, said illuminating unit including a carriage having wheel means thereon riding on said guide racks, an electric motor supported on said carriage having an output shaft aligned with a horizontal axis intercepting the center of said diffusing screen, a circular disk affixed to said output shaft in concentric relation thereto and arranged in a vertical plane paralleling the plane of said screen, and a plurality of projector lamps mounted on the face of said disk adjacent said screen and projecting toward said screen, and an open-ended tubular shield surrounding each of said projector lamps and opening in the direction of said screen, and drive means manually operable externally of said housing for adjusting the position of said illuminating unit and said transparency supporting unit along said guide racks.

5. Apparatus for producing animated image effects to be photographically recorded for production of motion pictures, filmed television program items and the like comprising a housing including a vertical front wall having a display opening therein, diffusing screen means covering said display opening and adapted to have a composite animated image formed thereon to be photographed, guide means in said housing extending along an axis normal to said diffusing screen means, an illuminating unit supported for movement along said guide means, transparency supporting means supported for movement along said guide means and disposed between said illuminating unit and said diffusing screen means, said transparency supporting means having formations for supporting a plurality of transparent sheets carrying designs in parallelism to each other intercepting the radiation path from said illuminating unit to said diffusing screen means, access means in said housing adjacent said transparency supporting means for accommodating passage of said transparent sheets therethrough, said illuminating unit including carriage means having wheel means thereon riding on said guide means, an electric motor supported on said carriage means having a shaft located in substantial horizontal alignment with said screen means, and extending transversely of the housing, an opaque annular cylindrical drum fixed to said shaft and driven thereby, said drum being coaxial with said shaft, and a plurality of projector lamps projecting radially outwardly from the periphery of said drum and lying in a common vertical plane extending perpendicular to the plane of said screen means, and manually operable means coupled with said illuminating unit and said transparency supporting means for adjusting the position thereof along said guide means.

6. Apparatus for producing animated image effects to be photographically recorded for production of motion pictures, filmed television program items and the like comprising an elongated housing including a transverse vertical front wall having a display opening therein and side walls, a planar, translucent diffusing screen covering said display opening and adapted to have a composite animated image formed thereon to be photographed from externally of the housing, parallel guide racks in said housing extending longitudinally of the housing along an axis normal to the plane of said diffusing screen, an illuminating unit supported for movement along said guide racks, a transparency supporting unit including a carriage movable along said guide racks and a transparency supporting frame pivotally supported on said carriage for rotation about the vertical medial axis of the frame and disposed between said illuminating unit and said diffusing screen, said transparency supporting frame having transverse slots opening laterally of the frame for supporting a plurality of design-carrying transparent sheets in parallelism to each other intercepting the radiation path from said illuminating unit to said diffusing screen, one of said side walls having an access opening therein laterally aligned with said transparency supporting frame for accommodating passage of said transparent sheets therethrough, said illuminating unit including carriage means having wheel means thereon riding on said guide racks, an electric motor supported on said carriage means having a shaft located in substantial horizontal alignment with said screen, and extending transversely of the housing, an opaque annular cylindrical drum fixed to said shaft and driven thereby, said drum being coaxial with said shaft, and a plurality of projector lamps projecting radially outwardly from the periphery of said drum and lying in a common vertical plane extending perpendicular to the plane of said screen, and manually operable means coupled with said illuminating unit and said transparency supporting unit for adjusting the position thereof along said guide racks.

7. Apparatus for producing animated image effects to be photographically recorded for production of motion pictures, filmed television program items and the like comprising a housing including a vertical front wall having a display opening therein, diffusing screen means covering said display opening and adapted to have a composite animated image formed thereon to be photographed, guide means in said housing extending along an axis normal to said diffusing screen means, an illuminating unit supported for movement along said guide means, transparency supporting means supported for movement along said guide means and disposed between said illuminating unit and said diffusing screen means, said transparency supporting means having formations for supporting a plurality of transparent sheets carrying designs in parallelism to each other intercepting the radiation path from said illuminating unit to said diffusing screen means, access means in said housing adjacent said transparency supporting means for accommodating passage of said transparent sheets therethrough, said illuminating unit including projector lamp means for imaging the designs carried by said transparent sheets onto said diffusing screen means and an electric motor for producing movement of the projector lamp means angularly of said axis to produce movement of the designs imaged on said diffusing screen means, drive means coupled independently to said illuminating unit and said transparency supporting means and having manually operable parts located externally of said housing for adjusting the position of said illuminating unit and said transparency supporting means along said guide means, a peripherally supported rotatable transparent disk having a design thereon supported on said front wall externally of said housing in overlying relation to said diffusing screen means, and means for continually rotating said disk.

8. Apparatus for producing animated image effects to be photographically recorded for production of motion pictures, filmed television program items and the like comprising a housing including a vertical front wall having a display opening therein, diffusing screen means covering said display opening and adapted to have a composite animated image formed thereon to be photographed, guide means in said housing extending along an axis normal to said diffusing screen means, an illuminating unit supported for movement along said guide means, transparency supporting means supported for movement along said guide means and disposed between said illuminating unit and said diffusing screen means, said transparency supporting means having formations for supporting a plurality of transparent sheets carrying designs in parallelism to each other intercepting the radiation path from said illuminating unit to said diffusing screen means, access means in said housing adjacent said transparency supporting means for accommodating passage of said transparent sheets therethrough, said illuminating unit including projector lamp means for imaging the designs carried by said transparent sheets onto said diffusing screen means and an electric motor for producing movement of the projector lamp means angularly of said axis to produce movement of the designs imaged on said diffusing screen means, drive means coupled independently to said illuminating unit and said transparency supporting means and having manually operable parts located externally of said housing for adjusting the position of said illuminating unit and said transparency supporting means along said guide means, a circular transparent disk having a design thereon, a plurality of rollers rotatably mounted on said front wall in a circular path concentric with the center of said display opening, peripherally supporting said disk for rotation about said center, and means for continually driving one of said rollers to impart rotation to said disk.

9. Apparatus for producing animated image effects to be photographically recorded for production of motion pictures, filmed television program items and the like comprising a housing including a vertical front wall having a display opening therein, diffusing screen means covering said display opening and adapted to have a composite animated image formed thereon to be photographed, guide means in said housing extending along an axis normal to said diffusing screen means, an illuminating unit supported for movement along said guide means, transparency supporting means supported for movement along said guide means and disposed between said illuminating unit and said diffusing screen means, said transparency supporting means having formations for supporting a plurality of transparent sheets carrying designs in parallelism to each other intercepting the radiation path from said illuminating unit to said diffusing screen means, access means in said housing adjacent said transparency supporting means for accommodating passage of said transparent sheets therethrough, said illuminating unit including projector lamp means for imaging the designs carried by said transparent sheets onto said diffusing screen means and an electric motor for producing movement of the projector lamp means angularly of said axis to produce movement of the designs imaged on said diffusing screen means, drive means coupled independently to said illuminating unit and said transparency supporting means and having manually operable parts located externally of said housing for adjusting the position of said illuminating unit and said transparency supporting means along said guide means, a pair of elongated spools supported on said front wall adjacent the opposite lateral edges of said display opening and extending at least the height of said opening, means for manually rotating said spools, an elongated transparent sheet wound on said spools and extending therebetween in overlying relation to said display opening, said sheet having designs portrayed thereon to be superposed on the image formed on said diffusing screen means and to be shifted laterally of said diffusing screen means upon rotation of said spools.

No references cited.